United States Patent Office 3,068,298
Patented Dec. 11, 1962

---

3,068,298
CHLORINE-CONTAINING AROMATICS
Clarence W. Huffman, Glenview, Ill., assignor to International Minerals & Chemical Corporation, a corporation of New York
No Drawing. Filed Nov. 28, 1958, Ser. No. 776,737
7 Claims. (Cl. 260—651)

The present invention relates to chlorine-containing aromatic compositions, and more particularly to chlorine-containing methyl aromatic compounds and to derivatives thereof.

One object of the invention is to prepare chlorine-containing derivatives of methyl aromatic compounds.

Another object is to prepare methyl aromatic compounds containing ring-substituted and methyl-substituted chlorine atoms.

Another object is to convert methylnaphthalenes into naphthalene derivatives containing both chloro and chloromethyl substituents.

Another object is to improve the utilization of chlorine in the chlorination of aromatics.

Another object is to prepare herbicidal esters of controlled low volatility.

Another object is to prepare high-boiling esters having improved plasticizer and lubricant properties.

Another object is to prepare aromatic amines having improved properties in the flotation of minerals.

Other objects of the invention and its advantages over the prior art will be apparent from the following description.

In one aspect of the invention, a methyl-substituted aromatic compound is subjected to chlorination in the absence of actinic light to produce a derivative thereof containing both monochlorinated methyl groups and ring-substituted chlorine.

As a specific example of such a process, a mixture of methylnaphthalenes averaging about 1.5 methyl groups per naphthalene molecule is treated with chlorine in the absence of actinic light at a temperature between about 100 and about 175° C. until between about 1.5 and about 2.5 atoms of chlorine have been absorbed per molecule of the naphthalene compounds. Chlorination is then discontinued, and the product is fractionally distilled at reduced pressure. Under these conditions, monochlorination of the methyl groups is maximized, with the result that at least about half of the chlorine in the product exists in the form of monochlorinated methyl groups, while the remainder is substituted at various points on the aromatic rings.

In another aspect of the invention, a methylated aromatic fraction is subjected to chloromethylation by reaction with formaldehyde and hydrogen chloride under conventional conditions, and the chloromethylated derivative is subjected to chlorination in the absence of actinic light according to the procedure set forth above. By this means, the proportion of monochlorinated methyl groups can be substantially increased, so that the product contains a higher proportion of reactive chlorine, and is convertible into a wider range of derivatives.

In a modification of the foregoing procedure, the chloromethylation product is subjected to chlorination under conditions known to favor attachment of chlorine to the ring or rings, thereby producing a composition of increased chlorine content, useful as a nematocide and as a flame retardant. Chlorinations of this type are readily carried out at or around ordinary temperatures, e.g., from about 15 to 40° C. or somewhat higher, and in the presence of actinic light and/or a catalytic proportion of arsenic, iron, or the like.

In a highly advantageous aspect of the invention, a methyl aromatic compound is first subjected to chlorination in the described manner to produce a product containing both chloro and chloromethyl groups. For each chlorine atom reacted in this way, a molecule of hydrogen chloride is produced as a by-product. The by-product material is then employed for chloromethylating another quantity of the methylated aromatic, so that a simple chloromethylated product is also obtained. If desired, the chloromethylated derivative can be cycled to the chlorination step. In such case, the methylated aromatic moves successively through chloromethylation, then chlorination, while the chlorine moves in counter flow through chlorination, then chloromethylation. In this way, substantially complete utilization of the chlorine to produce chlorine substituents of the desired types is achieved.

The chlorination process employed in the preferred form of the present invention requires the absence of actinic light in order to obtain chloromethyl radicals in the product and in order to produce the desired ratio of chloromethyl to chloro substituents. The temperature is optimally around 140 to 150° C., but may range from about 100 to about 175° C. Catalysts may be employed if desired to increase chlorination in the aromatic ring. Chlorine addition should be limited to reach the desired chlorine level and to obtain a product boiling within the desired range. The reaction product may be purified in any convenient manner, but ordinarily requires only fractional distillation to isolate a purified fraction having the desired chlorine content.

Chloromethylation, if employed, is conveniently carried out with paraformaldehyde, hydrochloric acid, and hydrogen chloride according to methods fully described in the art, such as the basic Blanc method (Organic Reactions, I, 63). Variant methods are described by Hartough (Ind. Eng. Chem., 42 (1950), 903–8, by Yamashita (Chemical Abstracts, 48 (1954), 10372), by Ried and Boden (Ber., 91 (1958), 1354), and by Pinkernelle (U.S. Pat. 2,219,-873, issued October 29, 1940). The chloromethylation product tends to turn green during storage, but this tendency can be overcome by dissolving therein a small proportion, e.g., around 0.1 to 1% by weight, of an epoxide, a tertiary amine, or a sterically blocked secondary amine. Suitable stabilizers include diisopropylamine, triethylamine, tri-n-butylamine, propylene oxide, styrene oxide, butyl oleate epoxide, and the like.

The primary products of the present invention may be represented by the formula $$(CH_2Cl)_m—Ar—Cl_n$$

where Ar represents the aromatic hydrocarbon nucleus, where $m$ is 1 or higher, where $n$ is ordinarily at least about 0.5, and where the aromatic nucleus may also contain one or more methyl groups. It will be recognized that products obtained from mixed stocks of varying degrees of methylation will contain chloro and chloromethyl substituents in varying proportions which do not necessarily give integral values of $m$ and $n$ on the average. It will be apparent that the maximum possible value for the sum of $m$ and $n$ must be the total number of hydrogen atoms originally attached to the aromatic nucleus. The product should preferably contain substantially no dichlorinated or trichlorinated methyl groups; and to minimize production of such groups through overchlorination, it is desirable to limit the quantity of added chlorine to not substantially more than about one mole of chlorine per methyl group of the original aromatic compound. The preferred products are distillable, and to this end $m$ should be not greater than about 3, and $n$ should be not greater than about 1.5. In chlorination products obtained by the preferred procedure, $m$ and $n$ will generally be about equal to each other.

The invention also contemplates the preparation of esters, amines, and other derivatives of methylated aromatics, proceeding through chloromethyl derivatives thereof. The chloromethylated aromatics are readily converted into esters in a conventional manner by heating with a carboxylic acid in the presence of a hydrogen chloride acceptor, suitably triethylamine or other tertiary amine, or sodium carbonate or other inorganic alkali. Chloromethylnaphthalenes can be converted, for example, into the chloroacetate esters by reaction with chloroacetic acid, into herbicidal esters by reaction with 2,4-dichlorophenoxyacetic acid or with 2,4,5-trichlorophenoxyacetic acid, or into diesters, useful as plasticizers and lubricants, by reaction with adipic acid, phthalic acid, sebacic acid, or the like.

The chloromethylated aromatics are also convertible into amines by reaction with ammonia or with aliphatic amines such as methylamine, diethylamine, isopropylamine, n-butylamine, or higher aliphatic (e.g., $C_{12}$–$C_{18}$) primary and secondary amines. The resulting amines are useful in the selective flotation of a variety of minerals, e.g., phosphate rock, sylvinite, crude langbeinite, and many others, and for this purpose the product of reaction with ammonia is especially effective.

The present invention is generally applicable to the treatment of methyl-substituted aromatic compounds, including mononuclear compounds such as the xylenes, hemimellitene, pseudocumene, mesitylene, prehnitene, durene, isodurene, and the like, and polynuclear compounds such as the methylnaphthalenes, dimethylnaphthalenes, and polymethylnaphthalenes, the methylated anthracenes, the methylated phenanthrenes, the methylated indenes, and the like. Numerous crude, semi-crude, and residual petroleum fractions exist which contain materials of the foregoing types. Thermally cracked stocks and the so-called "hydroformer bottoms" and "catalytic cycle oil" obtained in petroleum processing are fractions especially rich in the fused-ring aromatics, with a high degree of methyl substitution. Distillate fractions of such materials are commercially available, and are highly satisfactory for use in the present invention. One such fraction is an orange-colored petroleum distillate boiling from about 225 to about 325° C. at 1 atmosphere and containing around 80% of mixed monomethyl-naphthalenes and dimethylnaphthalenes, the remainder being higher-boiling materials.

The following will illustrate two products of the invention, obtained from mixed monomethylnaphthalenes and dimethylnaphthalenes, which have especially desirable properties. In each case, the substitutent groups are attached at random to either or both rings.

| | Chlorine Content, Percent | | |
|---|---|---|---|
| | Aliphatic | Aromatic | Total |
| 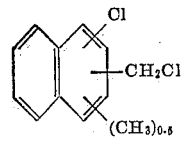 | 16.3 | 16.3 | 32.6 |
| 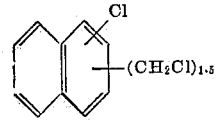 | 22.6 | 15.1 | 37.7 |

These materials are yellow to orange liquids which are high-boiling but distillable, having boiling points in the region of 100 to 200° C. at 0.5 mm. Hg.

The following operating examples will more clearly illustrate a number of aspects of the invention.

Example 1

A mixture of monomethyl- and dimethylnaphthalenes was subjected to chlorination according to the following procedure.

A crude petroleum fraction was subjected to fractional distillation at reduced pressure to separate a fraction boiling at 100–120° C. at 10 mm. Hg and comprising largely monomethyl- and dimethylnaphthalenes. A 100-gram portion of the distilled material was heated to 140° C. in a flask covered with aluminum foil to exclude light. Chlorine was added through a gas dispersion tube while the temperature was maintained at 140–160° C., little or no heat being required for this purpose. The addition of chlorine was discontinued when the weight gain had reached 50 grams. The product, a reddish-orange liquid weighing 150 grams, was distilled under vacuum, and the following fractions were obtained:

| Fraction No. | Boiling Range, °C. | Pressure, mm. Hg | Weight, g. | Color | Chlorine Content | | |
|---|---|---|---|---|---|---|---|
| | | | | | Aliphatic, percent | Aromatic, percent | Total, percent |
| 1 | 100–140 | 0.3 | 65.3 | Yellow | 13.2 | 12.0 | 25.2 |
| 2 | 140–188 | 0.5–4 | 60.6 | Orange | 23.5 | 14.0 | 37.5 |
| Residue | | | 21.0 | Black oil | 25.4 | 17.2 | 42.6 |

Example 2

A 2,4,5-trichlorophenoxyacetic acid ester was prepared according to the following procedure from chlorinated methylnaphthalenes, prepared according to the method of Example 1, containing 13.2% aliphatic chlorine and 12.0% aromatic chlorine, or a total of 25.2% chlorine.

2,4,5-trichlorophenoxyacetic acid (25.6 grams, 0.1 mole) was commingled with triethylamine (10.7 grams, 0.105 mole) in a 200 ml. flask equipped with a reflux condenser, and the mixture was stirred and heated to 120° C., at which point it has been converted entirely into a dark liquid. To this liquid was added the chlorinated methylnaphthalenes (26.9 grams) from a dropping funnel over a period of 18 minutes, during which time a quantity of white crystals formed. The resulting viscous mixture was subsequently stirred at 135° C. for 6 hours, then cooled.

The cooled reaction product was shaken with water (50 ml.), and the strongly acid aqueous solution obtained thereby was decanted from the dark oil. The oil was further washed three times at 60–75° C. with 50 ml. portions of water containing a total of 5.8 grams of potassium carbonate. The final wash was strongly alkaline. Acidification of the combined wash liquors gave 8.8 grams of recovered 2,4,5-T acid, dry basis, or 35% of the quantity originally employed.

Three additional 50 ml. water washings removed the entrained carbonate from the oil layer. Benzene (25 ml.) was added to the washed oil and the mixture was distilled under vacuum to a pot temperature of 125° C. The residual black ester weighed 37.3 grams, corresponding to a 77% yield, based on the weight of chlorinated methylnaphthalenes.

*Analysis.*—Calculated: Cl, 26%; saponification No., 175. Found: Cl, 25.7%; saponification No., 160; acid No., nil.

Example 3

The following example illustrates the successive chloromethylation and ring chlorination of a crude mixture of monomethyl- and dimethylnaphthalenes.

A 300-gram portion of the crude mixture was commingled with paraformaldehyde (66 g.) and concentrated hydrochloric acid (120 ml.), and stirred and heated gradually in a flask from 45° C. to 90° C. over a six-hour period while a total of 84 grams of anhydrous hydrogen chloride was bubbled into the mixture through a gas dispersion tube. The reaction product was cooled and filtered, and the oil layer was separated, washed several times with water, and concentrated under vacuum to 351 grams. The resulting crude, black material was fractionally distilled at reduced pressure, and a yellow chloromethylated fraction was isolated weighing 216 grams, boiling at 130–190° C. at 5 mm. Hg, having a density at 25° C. of 1.10 g./ml., and containing 15.7% Cl.

A 100-gram portion of the distilled material was commingled with carbon tetrachloride (100 ml.), ferric chloride (3.0 grams), and iodine (0.1 gram) in a 300 ml. glass flask, and the mixture was stirred and cooled as necessary to maintain the temperature at 25–30° C., while chlorine was bubbled in during a 6.5-hour period. The product solution was filtered to remove a small quantity of solids, washed twice with 100 ml. portions of water, and dried with anhydrous sodium carbonate (10 grams). The dried material was distilled under vacuum to remove the carbon tetrachloride, but the residual dark solid obtained thereby could not be distilled even under vacuum without decomposition. The solid material, weighing 155 grams, was separated into two fractions by extraction with a mixture of cyclohexane and petroleum ether. The original crude material and the fractions were found to have chlorine contents as follows:

|  | Proportion, percent | Chlorine Content, Percent | | |
|---|---|---|---|---|
|  |  | Aliphatic | Aromatic | Total |
| Crude solid product | 100 | 18.7 | 26.8 | 45.5 |
| Solid fraction | 35 | 11.0 | 32.3 | 43.3 |
| Liquid fraction | 65 | 21.6 | 24.0 | 45.6 |

*Example 4*

The following example illustrates the chloromethylation of a crude mixture of monomethyl- and dimethylnaphthalenes, followed by conversion of the product into a selective herbicidal ester.

A crude mixture of monomethyl- and dimethylnaphthalenes was subjected to chloromethylation by the procedure of Cockerille U.S. Patent 2,541,408 (February 13, 1951), using arsenic as a catalyst. The crude methylnaphthalene mixture had a density of 0.988 g./ml. at 26° C. and was dark orange in color with greenish fluorescence. Into a flask were placed 100 grams thereof, 48.8 grams of paraformaldehyde, 195.2 grams of concentrated hydrochloric acid, and 2.44 grams of $As_2O_3$. The mixture was stirred and warmed to 38° C., and gaseous hydrogen chloride was bubbled into the mixture at the rate of about 23 grams per hour. After one hour, most of the solids had dissolved. At the end of 2.5 hours, all of the solids had dissolved, and a dark upper layer had formed. The hydrogen chloride gas flow rate was then reduced ot about 1 gram/hour, and the temperature was gradually raised to 90° C. over the course of 3.5 hours, at the end of which time the reaction was terminated by cooling.

The reaction product was washed twice with 200 ml. portions of water, then with a sufficient quantity of sodium bicarbonate (about 100 grams) in 200 ml. of water to neutralize the acids, and finally with four 200 ml. portions of water. The washed material was dried by azeotropic distillation with benzene. The crude product weighed 138.4 grams. Fractional distillation of the crude material at about 5 mm. Hg gave 108.6 grams of chloromethylated product boiling at 150–200° C. at 5 mm. Hg, having a density of 1.12 g./ml. at 25° C., and containing 18.0% chlorine.

A naphthylmethyl ester of 2,4-dichlorophenoxyacetic acid was prepared from the distilled product according to the following procedure:

2,4-dichlorophenoxyacetic (22.1 grams) and triethylamine (10.7 grams) were introduced into a 200 ml. round-bottom glass flask equipped with a thermometer, a reflux condenser, a dropping funnel, and an electrical heating mantle. The mixture was stirred and heated to 125–140° C., and the distilled chloromethylation product (19.7 grams) was added dropwise over a period of 10 minutes. The temperature was maintained for a total of 6.75 hours, and the mixture was then cooled.

The reaction product mixture was washed with water to remove the crystalline triethylamine hydrochloride. The oily ester was thereafter washed successively with dilute aqueous potassium carbonate solution and with water. The ester was dried by azeotropic distillation with benzene under vacuum to a pot temperature of 110° C. The crude product was a black, viscous material weighing 37.4 grams, corresponding to a 98% yield.

*Analysis.*—Calculated for $C_{20.5}H_{17}Cl_2O_3$ (molecular weight 380): Cl, 18.6%; saponification No., 147. Found: Cl, 18.3%; saponification No., 143; acid No., 1.3.

The naphthylmethyl ester of 2,4-dichlorophenoxyacetic acid thus obtained was found to be much less volatile than the isooctyl ester, which is considered to be a standard "low-volatile" ester of 2,4-D.

The two esters were compared according to the procedure of Marth and Mitchell ("Test Methods with Plant-Regulating Chemicals," U.S.D.A., Agric. Handbook No. 126 (1958), pages 51–2), using tomatoes as the test plant. In each test, a small piece of filter paper was impregnated with a solution containing 0.2 mg. of the ester, the solvent was allowed to evaporate, and the paper was placed in a plastic dome covering the potted plant for a period of 72 hours. The dome and paper were then removed, and the curvature of the plant (i.e., its angular inclination from the vertical) was measured. The results were as follows:

| | Curvature, degrees |
|---|---|
| No ester | 6 |
| Isooctyl ester | 70 |
| Naphthylmethyl ester | 30 |

The foregoing demonstrates the lower volatility of the naphthylmethyl ester, by virtue of which it can be used with a minimum of damage to sensitive plants near the area being treated.

In a selective herbicidal test, an acetone solution of the naphthylmethyl ester containing the ester in a concentration of 500 p.p.m., calculated as free 2,4-D, killed mustard but not grass.

*Example 5*

The following example illustrates an integrated recycle process in which a methyl aromatic is first subjected to chloromethylation, and the reaction product is thereafter subjected to chlorination, the hydrogen chloride produced in the latter step being recycled to the former step.

A mixture of monomethyl- and dimethylnaphthalenes weighing 100 pounds, together with 20.2 pounds of technical paraformaldehyde and 80 pounds of 37% hydrochloric acid, is charged into a baffled reactor, and is stirred for a period of 6 hours while the temperature is raised from an initial level of 45° C. to a final level of 110° C. During this time, a total of 27 pounds of anhydrous hydrogen chloride, obtained from a later step in the process, is bubbled into the liquid. Unabsorbed hydrogen chloride is recovered and recycled. At the end of the reaction period, one pound of filter aid is added, and the mixture is filtered. The filtrate stratifies into two layers, and the lower aqueous layer, comprising about 80 pounds of around 25% hydrochloric acid, is recycled to the first step of the reaction. The oil phase is washed with water, then fractionally distilled under vacuum. A forerun weighing about 16 pounds is withdrawn for reprocessing. The primary chloromethylation product, weighing 94 pounds, is taken off at 140–195° C. at 5 mm. Hg. A tarry residue weighing 8 pounds is also obtained.

The chloromethylation product (94 pounds) and carbon tetrachloride (150 pounds) are introduced into a reaction vessel and treated with gaseous chlorine until 52 pounds of chlorine have been absorbed, the temperature being held at about 25° C. by cooling. About six hours are required for this purpose. The byproduct hydrogen chloride, weighing 27 pounds, is withdrawn for use in the chloromethylation reaction. After the chlorination is completed, the carbon tetrachloride is distilled off for reuse. The residual product weighs 146 pounds, and contains 18.7% aliphatic chlorine and 26.7% aromatic chlorine.

While the foregoing description and operating examples refer to numerous embodiments of the invention and to various details of starting materials, operating procedures, material ratios, process conditions, and products, it is to be understood that such matters are illustrative only, and are not intended by way of limitation. Numerous modifications and equivalents of the invention will be apparent from the foregoing description to those skilled in the art.

The following claims particularly point out and distinctly claim the subject matter of the invention.

I claim:

1. A method for selective chlorination of methylsubstituted polynuclear aromatics to effect the substitution of chlorine on the aromatic ring and monochlorination in a methyl group which comprises subjecting the methyl-substituted polynuclear aromatic compound in the liquid phase to contact with chlorine in the absence of actinic light at a temperature in the range between about 100 and about 175° C., and separating from the reaction mixture a compound having chlorine on the aromatic ring and monochlorination in a methyl side chain.

2. A method according to claim 1 wherein the temperature is in the range between about 140 and about 160° C.

3. A method for selective chlorination of naphthalene having at least one methyl group attached to the ring which comprises subjecting said methyl naphthalene in the liquid phase to contact with chlorine in the absence of actinic light at a temperature in the range between about 100 and about 175° C., terminating the reaction before more than about one atom of chlorine has been absorbed per methyl group in said naphthalene, and separating from the reaction mixture a chlorinated naphthalene having chlorine attached to the naphthalene nucleus and monochlorination in a methyl side chain.

4. A method according to claim 3 wherein the temperature is in the range between about 140 and about 160° C.

5. A method according to claim 3 wherein said naphthalene is monomethyl naphthalene.

6. A method according to claim 3 wherein said naphthalene is dimethyl naphthalene.

7. A method according to claim 3 wherein said naphthalene is a mixture of monomethyl and dimethyl naphthalenes.

References Cited in the file of this patent

UNITED STATES PATENTS

| | | |
|---|---|---|
| 606,470 | Monnet | June 28, 1898 |
| 2,063,151 | Dahlen et al. | Dec. 8, 1936 |
| 2,138,809 | Reiff et al. | Nov. 29, 1938 |
| 2,159,594 | Kyrides | May 23, 1939 |
| 2,230,753 | Klavehn | Feb. 4, 1941 |
| 2,387,702 | Funk | Oct. 23, 1945 |
| 2,412,389 | Cass | Dec. 10, 1946 |
| 2,570,022 | Boyd-Barrett et al. | Oct. 2, 1951 |
| 2,759,965 | Begin | Aug. 21, 1956 |
| 2,796,427 | Huisman | June 18, 1957 |

OTHER REFERENCES

Beilstein, vol. 5 (vierte Auflage), p. 297 (1922).
Achmatowicz et al.: "Roczniki Chem.," vol. 18 (1938), pp. 69–74 (32 Chem. Abstr. 9,076).
Gudriniece et al.: Chem. Abs. 49, 8217 (1955).